(12) United States Patent
Ohno et al.

(10) Patent No.: US 9,201,707 B2
(45) Date of Patent: Dec. 1, 2015

(54) DISTRIBUTED SYSTEM, DEVICE, METHOD, AND PROGRAM

(75) Inventors: Yoshiyuki Ohno, Tokyo (JP); Dai Kobayashi, Tokyo (JP); Masaki Kan, Tokyo (JP)

(73) Assignee: NEC CORPORATION, Tokyo (JP)

( * ) Notice: Subject to any disclaimer, the term of this patent is extended or adjusted under 35 U.S.C. 154(b) by 236 days.

(21) Appl. No.: 13/981,643

(22) PCT Filed: Jan. 31, 2012

(86) PCT No.: PCT/JP2012/000605
§ 371 (c)(1),
(2), (4) Date: Jul. 25, 2013

(87) PCT Pub. No.: WO2012/105230
PCT Pub. Date: Aug. 9, 2012

(65) Prior Publication Data
US 2013/0312004 A1 Nov. 21, 2013

(30) Foreign Application Priority Data
Feb. 2, 2011 (JP) .................................. 2011-020949

(51) Int. Cl.
*G06F 9/46* (2006.01)
*G06F 9/50* (2006.01)
*G06F 1/32* (2006.01)

(52) U.S. Cl.
CPC ............ *G06F 9/5094* (2013.01); *G06F 1/3206* (2013.01); *G06F 1/329* (2013.01); *Y02B 60/142* (2013.01); *Y02B 60/144* (2013.01)

(58) Field of Classification Search
CPC ..... G06F 9/5094; G06F 1/3206; G06F 1/329; Y02B 60/142; Y02B 60/144
See application file for complete search history.

(56) References Cited

U.S. PATENT DOCUMENTS 6,901,522 B2 * 5/2005 Buch .............................. 713/320
6,977,528 B2 * 12/2005 Kang et al. .................... 326/121

(Continued)

FOREIGN PATENT DOCUMENTS

| JP | 10-187636 A | 7/1998 |
| JP | 11-170666 A | 6/1999 |

(Continued)

OTHER PUBLICATIONS

Hirao et al. "Power Consumption Monitoring System for Personal Computers by Analyzing Their Operating States", 2005 IEEE, pp. 268-272.*

(Continued)

*Primary Examiner* — Van Nguyen
(74) *Attorney, Agent, or Firm* — Sughrue Mion, PLLC

(57) ABSTRACT

A distributed system includes: a plurality of ordinary nodes provided with reduced-power states having different times of recovery to a normal operating state; and a management node for assigning a job to an ordinary node for carrying out the job. The management node has: node select means for selecting an ordinary node from ordinary nodes each put in one of the reduced-power states, assigning a job to the selected ordinary node and driving the selected ordinary node to carry out the assigned job; and node control means for executing control to restore an ordinary node selected by the node select means to the normal operating state. The node select means selects an ordinary node from the ordinary nodes each put in one of the reduced-power states having different times of recovery to the normal operating state in accordance with an ordinary-node order starting with an ordinary node existing in a reduced-power state and having a short time of recovery to the normal operating state.

5 Claims, 9 Drawing Sheets

(56) References Cited

U.S. PATENT DOCUMENTS

| | | | |
|---|---|---|---|
| 7,088,141 B2* | 8/2006 | Deogun et al. | 326/82 |
| 7,243,006 B2* | 7/2007 | Richards | 700/286 |
| 7,334,142 B2* | 2/2008 | Hack | 713/320 |
| 7,490,254 B2* | 2/2009 | Clark | 713/320 |
| 7,539,882 B2* | 5/2009 | Jessup et al. | 713/300 |
| 8,006,111 B1* | 8/2011 | Faibish et al. | 713/324 |
| 8,909,614 B2* | 12/2014 | Kan et al. | 707/705 |

FOREIGN PATENT DOCUMENTS

| | | |
|---|---|---|
| JP | 2003-162515 A | 6/2003 |
| JP | 2006-343955 A | 12/2006 |
| JP | 2008-225639 A | 9/2008 |
| JP | 2010-165193 A | 7/2010 |
| JP | 2011-257834 A | 12/2011 |

OTHER PUBLICATIONS

Agarwal et al. "Power Management System for Embedded RTOS: An Object Oriented Approach", 2006 IEEE, pp. 2305-2309.*

Ramanathan et al. "System level online power management algorithms", 2000 IEEE, 6 pages.*

International Search Report for PCT Application No. PCT/JP2012/000605 mailed on Apr. 3, 2012.

Japanese Office Action for JP Application No. 2012-555746 mailed on Jan 6, 2015 with English Translation.

* cited by examiner

| STATE | POWER CONSUMPTION [W] | TIME OF TRANSITION TO IDLE STATE [SEC] | TIME OF TRANSITION FROM IDLE STATE [SEC] |
|---|---|---|---|
| EXECUTION STATE | 180 | (AFTER TASK COMPLETION) 0 | 0 |
| IDLE STATE | 130 | - | - |
| STOPPED STATE (LEVEL 1) | 80 | 1 | 3 |
| STOPPED STATE (LEVEL 2) | 15 | 3 | 10 |
| STOPPED STATE (LEVEL 3) | 0 | 20 | 180 |

DISTRIBUTED SYSTEM, DEVICE, METHOD, AND PROGRAM

This application is a National Stage Entry of PCT/JP2012/000605 filed Jan. 31, 2012, which claims priority from Japanese Patent Application 2011-020949 filed Feb. 2, 2011, the contents of all of which are incorporated herein by reference, in their entirety.

TECHNICAL FIELD

In general, the present invention relates to a distributed system having a plurality of nodes. More particularly, the present invention relates to a distributed system capable of reducing the amount of electric power consumed by the whole distributed system when a plurality of nodes are operating as one distributed system.

BACKGROUND ART

The distributed system has several tens to several thousands of nodes (computer/storage device) each provided with a processor and a storage medium. The nodes connected to each other by a network are used as one distributed system. In this way, the distributed system is capable of providing a computing power and/or a storage capacity which are impossible to obtain from one node.

An example of the distributed system is a distributed-storage system which comprises such nodes connected to each other by a network. The distributed-storage system stores data in HDDs (Hard Disk Drives) of the nodes and/or memories of the nodes and makes use of the stored data. In the distributed-storage system, for certain data, software or special hardware is used for determining which node memory is used for storing the data and which node computer is used for processing the data. That is to say, by dynamically changing the operation in accordance with the state of the system, the allocation of resources in the system can be adjusted so that the performance of the system can be enhanced when seen from the system user (or the client computer).

The amount of electric power consumed by 1 node included in a distributed system is about 150 W/H. Since a distributed system having a large size includes several hundreds to several thousands of such nodes, there is raised a problem that the amount of power consumed by the entire system is very large.

Since the magnitude of the load borne by the distributed system changes from time to time, however, a load requiring the 100% use of the nodes (or the use of all the nodes) is not always borne by the distributed system all the time. Thus, the number of ordinary nodes used in the system also changes from time to time. For example, only 10% of nodes in the system are used at one time and 90% of nodes in the system are used at another time.

In accordance with such changes in load magnitude, a node may incidentally enter an idle state in which the node is not carrying out any job or, in accordance with the magnitude of the load, the number of job processing nodes can be changed so that a node can be intentionally put in an idle state. For example, Patent Document 1 describes a cluster system which reduces the amount of consumed electrical power by putting a node in an idle state of carrying out no job in a suspend state.

In a computer system for carrying out large-scale computations by making use of a plurality of computers connected to each other as is the case with a super computer, the computations are performed by assigning jobs to a plurality of nodes in job management of assigning computation jobs to the nodes. That is to say, in this job management, when a certain job is completed, the next job is assigned to a plurality of nodes.

Patent Document 2 discloses a job management method adopted by a computer system such as the super computer described above to serve as a method for carrying out a job assigned to the system at a small amount of consumed power. In accordance with the job management method disclosed in Patent Document 2, the amount of electric power consumed by the entire system is reduced as follows. First of all, the conditions of jobs to be carried out by the computer system are saved whereas future job execution timings and the number of nodes required for the execution of each of the jobs are determined. Then, the nodes required for the execution of each of the jobs are prepared in advance prior to the execution of the job. On the other hand, a node not required for execution of a job is terminated.

In many cases, as the node termination used in the conventional technologies, node termination prescribed in an ACPI (Advanced Configuration and Power Interface) specification described in Non-patent Document 1 is normally adopted.

CITATION LIST

Patent Literature

Patent Document 1
JP-A-2003-162515
Patent Document 2
JP-A-2008-225639

Non-Patent Literature

Non-Patent Document 1:
ADVANCED CONFIGURATION AND POWER INTERFACE SPECIFICATION 4.0, Hewlett Packard, Intel, Microsoft, Phoenix Technology and Toshiba, Jun. 16, 2009.

SUMMARY OF INVENTION

Technical Problem

In the technology described in Patent Document 1, however, in order to reutilize a node once put in a stopped state such as the suspend state, it is necessary to put the node in a conductive state and to activate the OS so that it takes time to wait for the node to enter a usable state.

In addition, in accordance with the job management method described in Patent Document 2, a terminated node is resumed in advance on the basis of a job execution schedule in order to hide the time it takes to resume the node. This technique has a time hiding effect in a system like that for carrying out processing by putting jobs to be performed in an execution queue as is the case with a super computer. In particular, this technique is effective for concurrent processing in which one job is carried out by making use of several hundreds of nodes in collaborative operations in a time period of about at least several tens of minutes. If a request for processing to be carried out by the system cannot be predicted as is the case with a distributed-storage system or if concurrent processing is carried out, however, there is raised a problem that the time it takes to resume a node cannot be hidden. Normally, the concurrent processing is carried out for a number of small jobs each assigned to one node or a number of nodes or for a big job which is disassembled into small tasks each assigned to one node or a number of nodes.

In this way, in accordance with the technology described above, if a node is terminated in order to reduce the amount of consumed power, it takes time to resume the terminated node. Thus, there is raised a problem that the processing performance (processing time) deteriorates.

It is thus an object of the present invention to present a distributed system having a plurality of nodes, an information processing apparatus, a distributed method and a distributed program which are capable of reducing the amount of electric power consumed by the entire distributed system by putting a node in a stopped state and capable of preventing the processing performance from deteriorating when the load increases.

Solution to Problem

The distributed system according to the present invention is characterized in that:

the distributed system includes: a plurality of ordinary nodes provided with reduced-power states having different times of recovery to a normal operating state; and a management node for assigning a job to an ordinary node and for driving the ordinary node to carry out the assigned job;

the management node has: node select means for selecting an ordinary node from ordinary nodes each put in one of the reduced-power states, assigning a job to the selected ordinary node and driving the selected ordinary node to carry out the assigned job; and node control means for executing control to restore an ordinary node selected by the node select means to the normal operating state; and the node select means selects an ordinary node from the ordinary nodes each put in one of the reduced-power states having different times of recovery to the normal operating state in accordance with an ordinary-node order starting with an ordinary node existing in a reduced-power state and having a short time of recovery to the normal operating state.

The distributed system according to the present invention is characterized in that:

the distributed system includes: ordinary nodes each including power-supply control means and task executing means; and a management node including job receiving means for receiving a job execution instruction, job managing means for disassembling a job received by the job receiving means into one task or a plurality of tasks and for driving one ordinary node or a plurality of said ordinary nodes to execute the tasks and node power-supply control means for managing as well as controlling the states of power supplies of the ordinary nodes;

the power-supply control means has: a function to put an ordinary node in a reduced-power state at one of a plurality of stages having different amounts of electric power consumed at the reduced-power state and different times of recovery from the reduced-power state to a normal activated state; and a function to restore an ordinary node in a reduced-power state to the normal activated state;

the job managing means determines an ordinary-node count representing the number of ordinary nodes for carrying out tasks obtained as a result of disassembling a job received by the management node in accordance with the magnitude of the job;

if the number of ordinary nodes each put in the normal activated state and capable of carrying out the tasks is smaller than the ordinary-node count determined by the job managing means to represent the number of ordinary nodes for carrying out the tasks, the node power-supply control means carries out an active-node select function to select as many ordinary nodes from the ordinary nodes put at one or more state stages selected from the stages of the reduced-power state as required to satisfy the ordinary-node count representing the number of ordinary nodes for carrying out the tasks;

the node power-supply control means carries out the active-node select function to select ordinary nodes to be restored to the normal activated state among the ordinary nodes each put at one of the stages of the reduced-power state in accordance with an ordinary-node order starting with an ordinary node existing in a reduced-power state and having a short time of recovery to the normal activated state;

the node power-supply control means issues an activation instruction to each of the selected ordinary nodes as an instruction requesting the ordinary node to make a transition to the normal activated state;

the job managing means issues task execution instructions to ordinary nodes which are in the normal activated state and capable of executing tasks and to ordinary nodes restored to the normal activated state in accordance with the activation instruction issued by the node power-supply control means to serve as task execution instructions requesting the ordinary nodes to execute the tasks; and the task executing means carries out the tasks in accordance with the task execution instructions issued by the job managing means.

An information processing apparatus according to the present invention is characterized in that:

the information processing apparatus serves as an apparatus for assigning jobs to ordinary nodes included in a distributed system to serve as nodes for carrying out the jobs, comprises: node select means for selecting an ordinary node included in ordinary nodes each put in one of reduced-power states having different times of recovery to a normal operating state from the ordinary nodes each put in one of the reduced-power states, assigning a job to the selected ordinary node and driving the selected ordinary node to carry out the assigned job; and node control means for executing control to restore an ordinary node selected by the node select means to the normal operating state; and the node select means selects an ordinary node from the ordinary nodes each put in one of reduced-power states having different times of recovery to the normal operating state in accordance with an ordinary-node order starting with an ordinary node existing in a reduced-power state and having a short time of recovery to the normal operating state.

A distributed method according to the present invention is characterized in that the distributed method is adopted for assigning a job to an ordinary node for carrying out the job and comprises the steps of:

selecting an ordinary node included in ordinary nodes each put in one of reduced-power states having different times of recovery to a normal operating state from the ordinary nodes each put in one of the reduced-power states, assigning a job to the selected ordinary node and driving the selected ordinary node to carry out the assigned job;

executing control to restore the selected ordinary node to the normal operating state; and carrying out the above step of selecting an ordinary node by selecting the ordinary node from the ordinary nodes each put in one of the reduced-power states in accordance with an ordinary-node order starting with an ordinary node existing in a reduced-power state and having a short time of recovery to the normal operating state.

A distributed program according to the present invention is characterized in that the distributed program is to be executed by a computer for assigning jobs to ordinary nodes included in a distributed system to serve as nodes for carrying out the jobs by performing:

node select processing to select an ordinary node included in ordinary nodes each put in one of reduced-power states having different times of recovery to a normal operating state from the ordinary nodes each put in one of the reduced-power states, assign a job to the selected ordinary node and drive the selected ordinary node to carry out the assigned job; and node control processing to execute control to restore the selected ordinary node to the normal operating state, wherein the node select processing is performed by selecting an ordinary node from the ordinary nodes each put in one of the reduced-power states in accordance with an ordinary-node order starting with an ordinary node existing in a reduced-power state and having a short time of recovery to the normal operating state.

Advantageous Effects of the Invention

In accordance with the present invention, it is possible to present a distributed system having a plurality of nodes to serve as a system capable of reducing the amount of electric power consumed by the entire distributed system by putting a node in a stopped state and capable of preventing the processing performance from deteriorating when the load increases.

DESCRIPTION OF EMBODIMENTS

Figure 1:
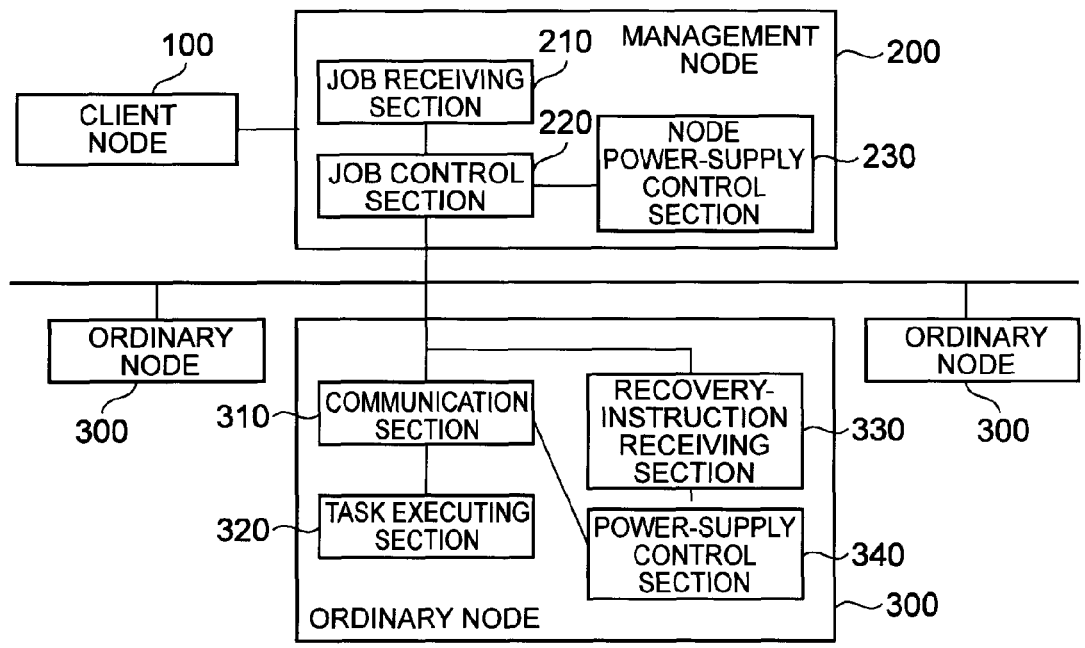
FIG. 1 It depicts a block diagram showing an example of the configuration of a distributed system according to the present invention.

An exemplary embodiment of the present invention is explained by referring to the diagrams as follows. FIG. 1 is a block diagram showing an example of the configuration of a distributed system according to the exemplary embodiment. As shown in FIG. 1, the distributed system comprises at least one client node 100 connected to a network having access-path determining means, at least one management node 200 and at least one ordinary node 300. The example shown in FIG. 1 includes one client node 100 and one management node 200. However, the distributed system may comprise a plurality of client nodes 100 and a plurality of management nodes 200.

Every ordinary node 300 has a node number (node 001 to node XXX). To put it concretely, each ordinary node 300 stores the node number assigned thereto in a storage section employed thereby.

The client node 100 is a node making a request for execution of a job. A job execution request made by the client node 100 is supplied to the management node 200 by way of the network. To put it concretely, the client node 100 transmits the request for execution of a job to the management node 200 through the network.

The management node 200 comprises a job receiving section 210, a job control section 220 and a node power-supply control section 230.

The job receiving section 210 has a function to receive a job execution request made by the client node 100. To put it concretely, the job receiving section 210 receives a job execution request transmitted by the client node 100 by way of the network. The following description makes use of an expression stating that the client node 100 issues a job execution request. To put it concretely, however, the client node 100 transmits the job execution request to the management node 200 by way of the network.

The job control section 220 has a function to disassemble a job received by the job receiving section 210 into tasks each serving as a unit executable by an ordinary node 300 and request ordinary nodes 300 to execute the tasks. To put it concretely, the job control section 220 disassembles a job specified in a job execution request received by the job receiving section 210 into tasks each serving as a unit executable by an ordinary node 300 and transmits requests for executions of the tasks to the ordinary nodes 300 by way of the network.

The node power-supply control section 230 has a function to manage power-supply states of ordinary nodes 300. In addition, the node power-supply control section 230 also has a function to determine an ordinary node 300 to carry out power-supply control of halting and resuming the operation of the ordinary node 300 and to transmit a request for the power-supply control to the ordinary node 300. To put it concretely, the node power-supply control section 230 transmits the request for the power-supply control to the ordinary node 300 by way of the network. The following description makes use of an expression stating that a request for power-supply control is issued. To put it concretely, however, the request for the power-supply control is transmitted to the ordinary node 300 by way of the network.

There are two types of the power-supply control request issued by the management node 200. One of the types is a termination instruction for terminating an ordinary node 300 and putting the ordinary node 300 in a reduced-power state (in the following description, the termination instruction is also referred to as a node termination instruction). The other type is a recovery instruction for restoring an ordinary node 300 from a reduced-power state (in the following description, the recovery instruction is also referred to as a node restoration instruction). That is to say, control is executed so that, when the ordinary node 300 receives a termination instruction, the ordinary node 300 makes a transition from an activated state to a reduced-power state and, when the ordinary node 300 receives a recovery instruction, on the other hand, the ordinary node 300 makes a transition from a reduced-power state to an activated state. (In the following description, the activated state is also referred to as typically an execution state, an idle state, a normal operating state or a normal activated state. These states will be described later.)

Figure 2:
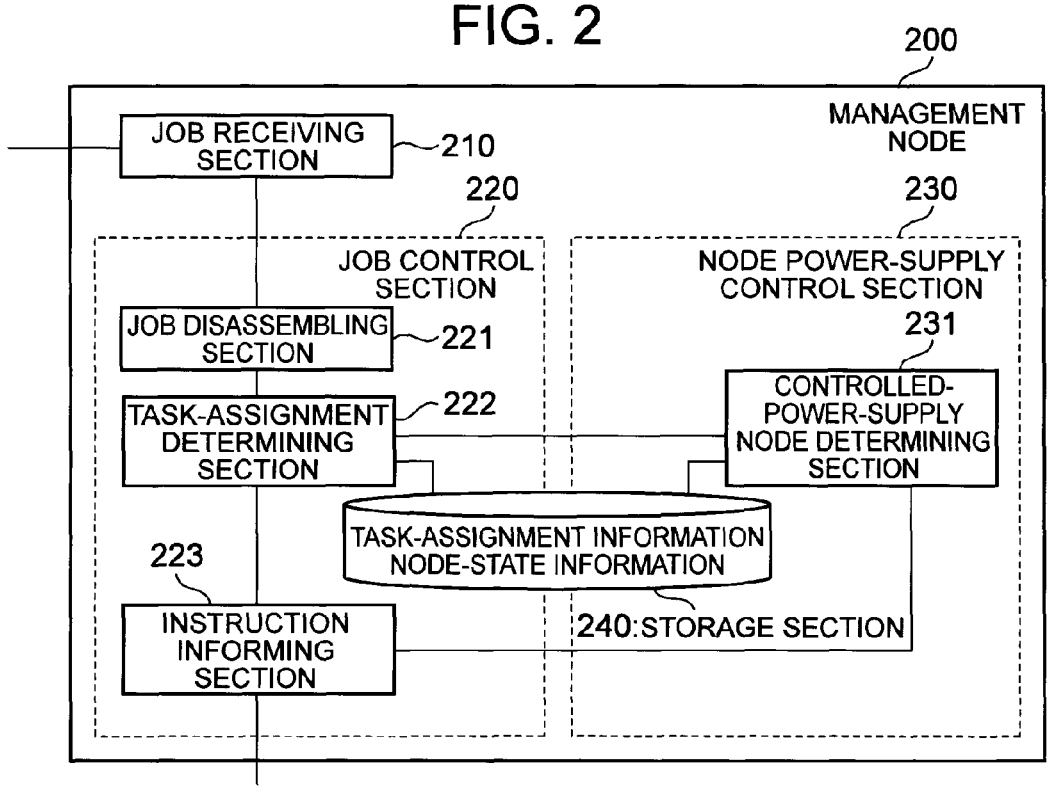
FIG. 2 It depicts a block diagram showing an example of the configuration of a management node employed in the distributed system.

FIG. 2 is a block diagram showing an example of the configuration of the management node 200. As shown in FIG. 2, the job control section 220 comprises a job disassembling section 221, a task-assignment determining section 222 and an instruction informing section 223.

The job disassembling section 221 has a function to disassemble a job into tasks each serving as a unit which can be executed by an ordinary node 300. To put it concretely, the job disassembling section 221 disassembles a job specified in a job execution request received by the job receiving section 210 into tasks each serving as a unit executable by an ordinary node 300.

The task-assignment determining section 222 has a function to determine an ordinary node 300 to carry out a task obtained in the job disassembling section 221 as a result of disassembling of a job.

The instruction informing section 223 has a function to inform an ordinary node 300, which has been determined by the task-assignment determining section 222, of a task execution instruction and a request for control of the power supply. The following description makes use of an expression stating that a task execution instruction is issued. To put it concretely, however, the management node 200 transmits the task execution instruction to an ordinary node 300 by way of the network.

In addition, the node power-supply control section 230 has a controlled-power-supply node determining section 231. The controlled-power-supply node determining section 231 has a function to determine an ordinary node 300 serving as an object of the control of the power supply and determine a power-supply state serving as the destination of a transition when the controlled-power-supply node determining section 231 receives a request for the control of the power supply (or a node activation request to be described later) from the job control section 220 or at intervals determined in advance.

In addition, the management node 200 has a storage section 240. The storage section 240 spread over the job control section 220 and the node power-supply control section 230 is used for storing task-assignment information and node-state information. The task-assignment information is used for managing states of assignments of tasks to ordinary nodes 300 and states of executions of tasks in ordinary nodes 300. On the other hand, the node-state information is used for managing the states of the power supplies of ordinary nodes 300.

In addition, as shown in FIG. 1, the ordinary node 300 comprises a communication section 310, a task executing section 320, a recovery-instruction receiving section 330 and a power-supply control section 340.

The communication section 310 has a function to receive a task execution instruction issued by the management node 200 and a termination instruction included in a request for control of the power supply.

The task executing section 320 has a function to carry out a task on the basis of the task execution instruction received by the communication section 310.

The recovery-instruction receiving section 330 has a function to receive a recovery instruction included in a request for control of the power supply.

The power-supply control section 340 has a function to carry out control of the power supply in accordance with a termination instruction received by the communication section 310 and a recovery instruction received by the recovery-instruction receiving section 330.

It is to be noted that, in this exemplary embodiment, one ordinary node 300 is capable of simultaneously carrying out processing on tasks, the number of which is determined in advance. To make the explanation simple, however, it is assumed that one ordinary node 300 is capable of processing only one task at a time in an example described below.

Figures 3, 4:
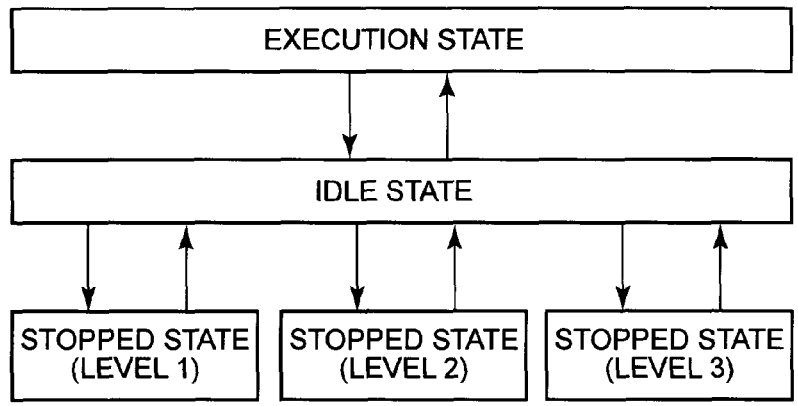
FIG. 3 It depicts a state-transition diagram showing typical transitions of the state of a power supply of an ordinary node employed in the distributed system.
FIG. 4 It depicts a table showing examples of the amount of electric power consumed in each power-supply state and examples of a transition time for each power-supply state in an ordinary node employed by the distributed system.

FIG. 3 is a diagram showing state transitions occurring in an ordinary node 300 during execution of control of the power supply. The ordinary node 300 is capable of making a transition from an idle state of carrying out no task to one of three types of a reduced-power state (level 1 of the stopped state, level 2 of the stopped state and level 3 of the stopped state).

Examples of the reduced-power state include a reduced-power state prescribed in the ACPI (Advanced Configuration and Power Interface) specification. In this exemplary embodiment, level 1 of the stopped state is a reduced-power state S1 (stopping the supply of electric power to the processor) prescribed in the ACPI specification whereas level 2 of the stopped state is a reduced-power state S3 (supplying electric power only to the memory) prescribed in the ACPI specification. On the other hand, level 3 of the stopped state is a reduced-power state S4 (saving contents stored in the memory into a disk and stopping all the supply of electric power) prescribed in the ACPI specification. However, even in any of these reduced-power states, electric power is supplied to the recovery-instruction receiving section 330 so that the recovery-instruction receiving section 330 is always capable of receiving a recovery instruction. In addition, even if the ordinary node 300 is put in a task execution state instead of being put in the idle state, data showing the execution state can be held in a storage apparatus such as a memory or a disk drive in advance before the ordinary node 300 makes a transition to a reduced-power state by way of the idle state.

The power-reduction effects of the reduced-power states S1, S3 and S4 increase in the same order as the order in which the reduced-power states S1, S3 and S4 are enumerated in this sentence. That is to say, the power-reduction effect of the reduced-power state S1 is smallest whereas the power-reduction effect of the reduced-power state S3 is relatively small and the power-reduction effect of the reduced-power state S4 is largest. On the other hand, the time it takes to make a transition from the idle state to the reduced-power state S1, S3 or S4 or a recovery transition from the reduced-power state S1, S3 or S4 to the idle state increases in the same order as the order in which the reduced-power states S1, S3 and S4 are enumerated in this sentence. That is to say, the state transition time of the reduced-power state S1 is shortest whereas the state transition time of the reduced-power state S3 is relatively short and the state transition time of the reduced-power state S4 is longest. In other words, the longer the state transition time of a reduced-power state, the larger the power-reduction effect of the reduced-power state. As a reference, FIG. 4 is given to serve as a table showing examples of an amount of electric power consumed in each power-supply state and examples of a transition time for each power-supply state in an ordinary node 300.

This exemplary embodiment is provided with the three reduced-power states prescribed in the ACPI specification. However, the number of reduced-power states is arbitrary. That is to say, the number of reduced-power states can have any value larger than 1. In addition, the reduced-power states do not have to be the reduced-power states prescribed in the ACPI specification. That is to say, the reduced-power states are not prescribed in particular in the present invention.

Next, the following description explains task-assignment information and node-state information which are held in the management node 200 included in the distributed system according to this exemplary embodiment. As described above, the task-assignment information and the node-state information are stored in the storage section 240 employed in the management node 200.

The task-assignment information includes information indicating whether or not any of ordinary nodes 300 is carrying out a task. On the other hand, the node-state information includes information indicating whether any of ordinary nodes 300 has been put in a stopped state, which is a reduced-power state, or has been activated. For example, if a certain ordinary node 300 has been put in a stopped state, which is a reduced-power state, the node-state information includes information indicating that the ordinary node 300 has been put in the stopped state. In addition, the node-state information also includes information indicating the number of ordinary nodes 300 put in a state for every state.

Next, the following description explains a flow of processing carried out to execute a job in the distributed system according to this exemplary embodiment.

Figure 5:
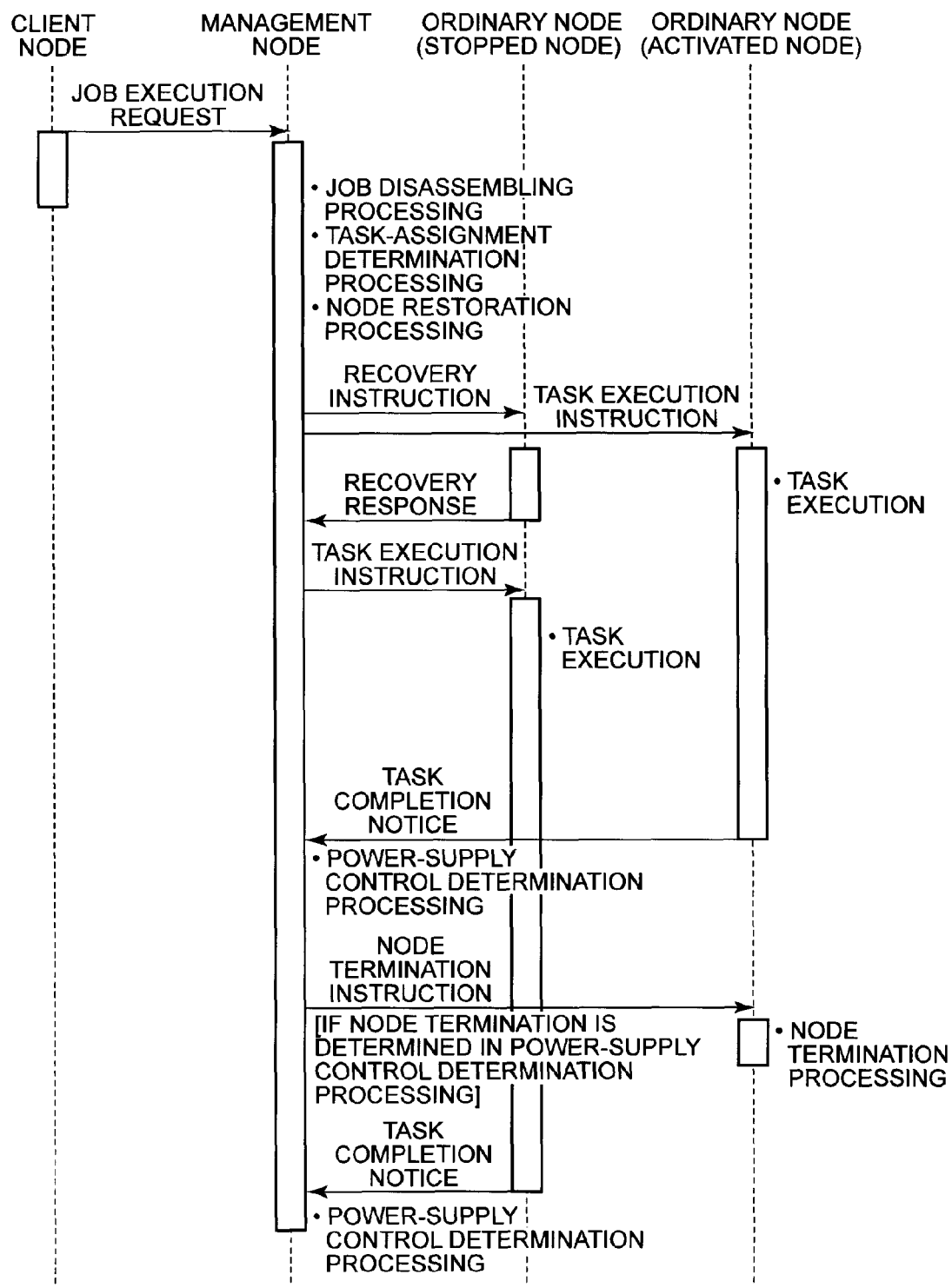
FIG. 5 It depicts a sequence diagram showing an example of execution of a job in the distributed system.

FIG. 5 is a sequence diagram showing execution of a job. First of all, the client node 100 transmits a request for the execution of the job to the management node 200. Then, in the management node 200 receiving the request for the execution of the job from the client node 100, the job disassembling section 221 disassembles the received job into one or more tasks (job disassembling processing shown in FIG. 5). In this case, by the received job, a job specified in the request for the execution of a job is implied.

As the job disassembling processing is completed, for every task obtained as a result of the job disassembling processing, the task-assignment determining section 222 employed in the management node 200 determines which ordinary node 300 is to be designated to serve as a node for carrying out the task (task-assignment determination processing shown in FIG. 5).

In the task-assignment determination processing, the management node 200 determines whether or not activated ordinary nodes 300 are capable of carrying out tasks obtained as a result of the job disassembling processing because some of the ordinary node 300 may have been stopped due to the fact that some of the ordinary nodes 300 have been put in a reduced-power state. If the management node 200 determines that some of the ordinary nodes 300 are not capable of carrying out the tasks, the management node 200 restores some of the ordinary nodes 300 which have been stopped due to the fact that some of the ordinary nodes 300 have been put in a reduced-power state or restores all the ordinary nodes 300 (node restoration processing shown in FIG. 5).

In the node restoration processing, the task-assignment determining section 222 provides the node power-supply control section 230 with a request for activation of ordinary nodes 300 and the number of ordinary nodes 300 to be restored. Then, the node power-supply control section 230 determines ordinary nodes 300 to be restored and issues a node restoration instruction to the determined ordinary nodes 300. Later on, the ordinary nodes 300 receiving the node restoration instruction carry out node restoration processing and return node restoration responses to the management node 200 after the node restoration processing. In this case, the node restoration processing is typically an operation carried out to control the ordinary node 300 to make a transition from a stopped state to an idle state.

In addition, at the same time as the node restoration processing, the task-assignment determining section 222 issues a task execution instruction to an ordinary node 300 already activated at the point of time by way of the instruction informing section 223. On the other hand, the task-assignment determining section 222 issues a task execution instruction to an ordinary node 300, which is restored by carrying out the node restoration processing, after the node restoration response has been received.

The ordinary node 300 receiving the task execution instruction carries out a task in accordance with the task execution instruction and transmits a notice of completion of the task execution to the management node 200 after the task has been carried out.

The management node 200 receiving the notice of completion of task execution from the ordinary node 300 completing the execution of a task determines whether or not to stop the ordinary node 300 by putting the ordinary node 300 in a reduced-power state (power-supply control determination processing). Then, if the management node 200 determines to stop the ordinary node 300 by putting the ordinary node 300 in a reduced-power state, the management node 200 issues a node termination instruction to the ordinary node 300. Receiving the node termination instruction, the ordinary node 300 stops itself by making a transition to the reduced-power state. If the management node 200 determines not to stop the ordinary node 300 in the power-supply control determination processing, on the other hand, the management node 200 stays as it is by carrying out nothing so that the ordinary node 300 also stays in an idle state to wait for an instruction.

Next, the following description explains the job disassembling processing, the task-assignment determination processing, the node restoration processing and the power-supply control determination processing which are carried out by the management node 200. In addition, the following description also explains a sequence of processing carried out by the management node 200 in conjunction with the ordinary node 300 to issue a node restoration instruction, a task execution instruction and a node termination instruction from the management node 200 to the ordinary node 300.

In the job disassembling processing, the job disassembling section 221 disassembles a job into one task or a plurality of tasks, but the number of tasks obtained as a result of the job disassembling processing must not exceed the difference between the total number of ordinary nodes 300 and the number of ordinary nodes 300 each carrying out a task. At that time, the job disassembling section 221 disassembles the job into tasks which can each be carried out by one ordinary node 300. For example, the job is processing to merge numerical sequences recorded in N original files into a resulting file and to sort the resulting file. In this case, it is possible to think of a method for carrying out the job by disassembling the job into (N−1) sort tasks and 1 (sort and file merge) task.

If the amount of processing to carry out 1 task is increased by decreasing the number of tasks, the number of ordinary nodes 300 required for carrying out the tasks becomes smaller so that other ordinary nodes 300 can be stopped by putting the other ordinary nodes 300 in a reduced-power-consumption state. Thus, the power reduction effect is big. In this case, however, the time it takes to carry out the job becomes longer. If the amount of processing to carry out 1 task is decreased by rising the number of tasks, on the other hand, the number of ordinary nodes 300 required for carrying out the tasks becomes larger so that fewer other ordinary nodes 300 can be stopped by putting the other ordinary nodes 300 in a reduced-power-consumption state. Thus, the power reduction effect is small. In this case, however, the time it takes to carry out the job becomes shorter. It is to be noted that, in the present invention, the method adopted by the job disassembling section 221 to disassemble a job into tasks is not prescribed in particular.

In the task-assignment determination processing, for every task obtained as a result of the job disassembling processing, the task-assignment determining section 222 employed in the management node 200 determines which ordinary node 300 is to be designated to serve as a node for carrying out the task. To put it concretely, the task-assignment determining section 222 refers to the node-state information stored in the storage section 240 in order to determine whether or not the number of tasks exceeds the number of ordinary nodes 300 each put in an idle state. If the task-assignment determining section 222 determines that the number of tasks does not exceed the number of ordinary nodes 300 each put in an idle state, from the ordinary nodes 300 each put in an idle state, the task-assignment determining section 222 selects as many ordinary nodes 300 as the tasks to serve as nodes each used for carrying out one of the tasks.

If it is determined that the number of tasks is greater than the number of ordinary nodes 300 each put in an idle state, on the other hand, the task-assignment determining section 222 designates all the ordinary nodes 300 each put in an idle state to serve as nodes each used for carrying out one of the tasks. Then, the task-assignment determining section 222 activates other ordinary nodes 300 by carrying out the node restoration processing and designates each of the other ordinary nodes 300 to serve as a node used for carrying out one of the remaining tasks. In this case, the number of other ordinary nodes 300 to be activated is equal to a difference obtained as a result of subtracting the number of ordinary nodes 300 each put in an idle state from the number of tasks.

If the ordinary node 300 designated to serve as a node for carrying out a task is an ordinary node 300 put in an idle state, the ordinary node 300 starts executing the task right after the task-assignment determination processing in accordance with a task execution instruction. If the ordinary node 300 designated to serve as a node for carrying out a task is an ordinary node 300 put in a stopped state, on the other hand, the ordinary node 300 starts executing the task in accordance with a task execution instruction after the ordinary node 300 has made a transition to an idle state by execution of the node restoration processing. It is to be noted that the description of the present invention does not particularly include an explanation of a method for determining which ordinary node 300 is to be selected from ordinary nodes 300 each put in an idle state to serve as a node for carrying out a task. In addition, the description of the present invention also does not particularly include an explanation of a method for determining an ordinary node 300 to which a specific task is to be assigned and a method for determining which task is to be assigned to any specific one of the selected ordinary nodes 300.

Figure 6:
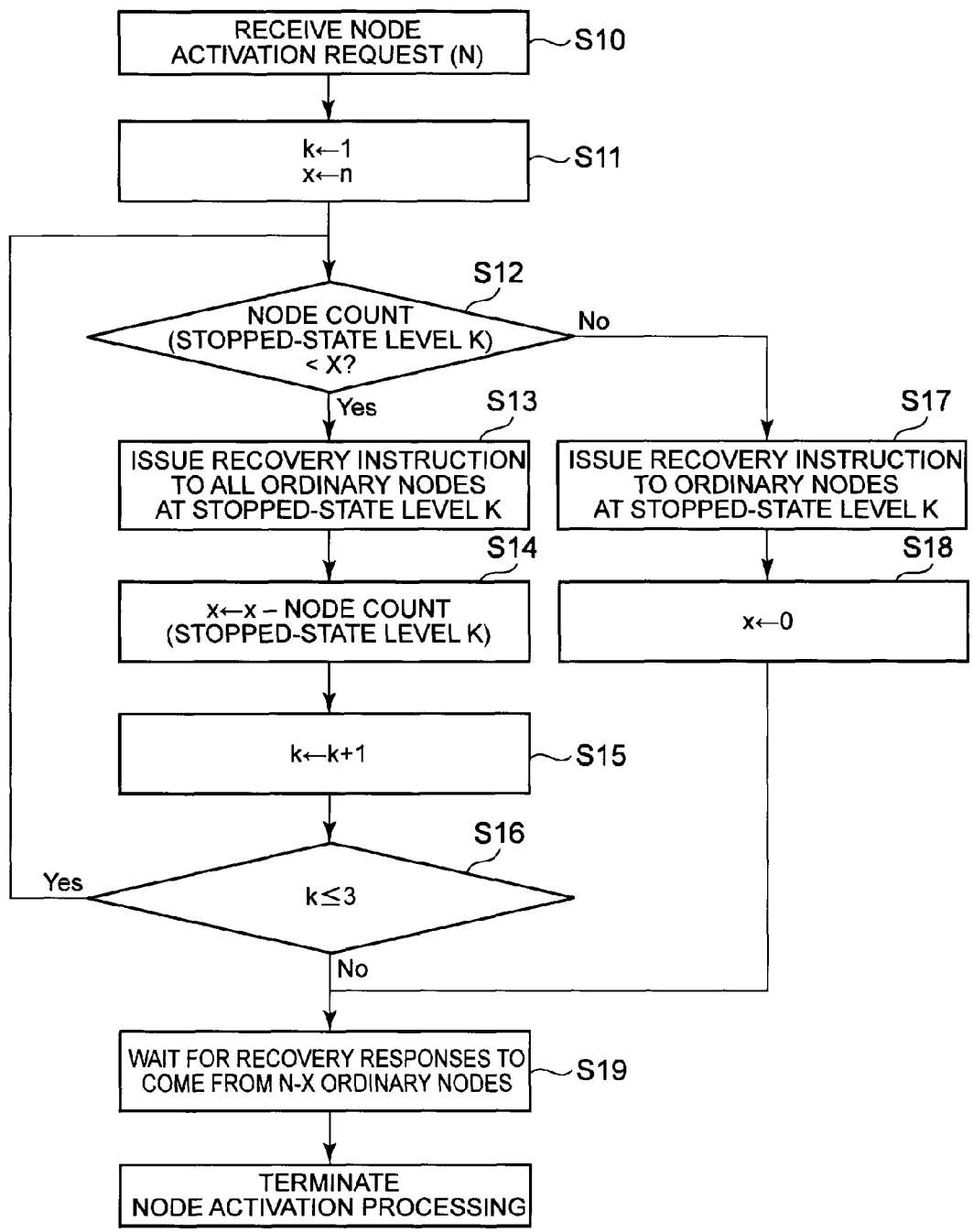
FIG. 6 It depicts a flowchart showing an example of a restored-node select procedure carried out in the distributed system by a node power-supply control section employed in a management node.

In the node restoration processing, the task-assignment determining section 222 provides the node power-supply control section 230 with a request for activation of ordinary nodes 300 and the number of ordinary nodes 300 to be activated. FIG. 6 is a diagram showing a flowchart of a procedure in accordance with which the node power-supply control section 230 receives the request for activation of ordinary nodes 300, selects as many ordinary nodes 300 each put in an idle state as specified by the number of ordinary nodes 300 to be activated and issues a recovery instruction to each of the selected ordinary nodes 300. In accordance with the restored-node select procedure shown in FIG. 6, the node power-supply control section 230 issues a recovery instruction to the ordinary nodes 300 each selected to serve as a node to be restored from a stopped state in an ordinary-node order starting with an ordinary node 300 put at level 1 of the stopped state, that is, in an ordinary-node order starting with an ordinary node 300 having a small power reduction effect and a short recovery time.

As shown in FIG. 6, the flowchart of the procedure begins with a step S10 at which the node power-supply control section 230 receives a request for activation of ordinary nodes 300 from the task-assignment determining section 222. At this step, in addition to the request for activation of ordinary nodes 300, the node power-supply control section 230 also receives an activated-node count n representing the number of ordinary nodes 300 to be activated.

Then, at the next step S11, the node power-supply control section 230 sets a stopped-state level number k at 1 and sets a variable x at the activated-node count n. Then, at the next step S12, the node power-supply control section 230 determines whether or not the number of ordinary nodes 300 each put at level k of the stopped state is smaller than the variable x. The restored-node select processing is carried out in accordance with this procedure in an ordinary-node order starting with ordinary nodes 300 each put at the lowest level of the stopped state.

If the node power-supply control section 230 determines that the number of ordinary nodes 300 each put at level k of the stopped state is smaller than the variable x, the flow of the procedure goes on to a step S13 at which the node power-supply control section 230 issues a recovery instruction to all the ordinary nodes 300 each put at level k of the stopped state. Then, the node power-supply control section 230 sets the variable x at a difference obtained as a result of subtracting the number of ordinary nodes 300 each put at level k of the stopped state from the variable x, and then, the sequence of the processes of the steps S12 and S13 is carried out repeatedly in a level-number order starting with the smallest stopped-state level number k of 1 till the node power-supply control section 230 determines that the stopped-state level number k is greater than 3 (steps S14, S15, and S16). Thereafter, the flow of the procedure goes on to a step S19 at which the node power-supply control section 230 enters a state of waiting for (n−x) node restoration responses, and then, the node power-supply control section 230 terminates the node activation processing.

If the node power-supply control section 230 determines that the number of ordinary nodes 300 each put at level k of the stopped state is equal to or greater than the variable x at the step S12, on the other hand, the flow of the procedure goes on to a step S17 at which the node power-supply control section 230 issues a recovery instruction to only x ordinary nodes 300 each put at level k of the stopped state. Then, at the next steps S18 and S19, the node power-supply control section 230 enters a state of waiting for n node restoration responses to come from the ordinary nodes 300. Thereafter, the node power-supply control section 230 terminates the node activation processing.

Figure 7:
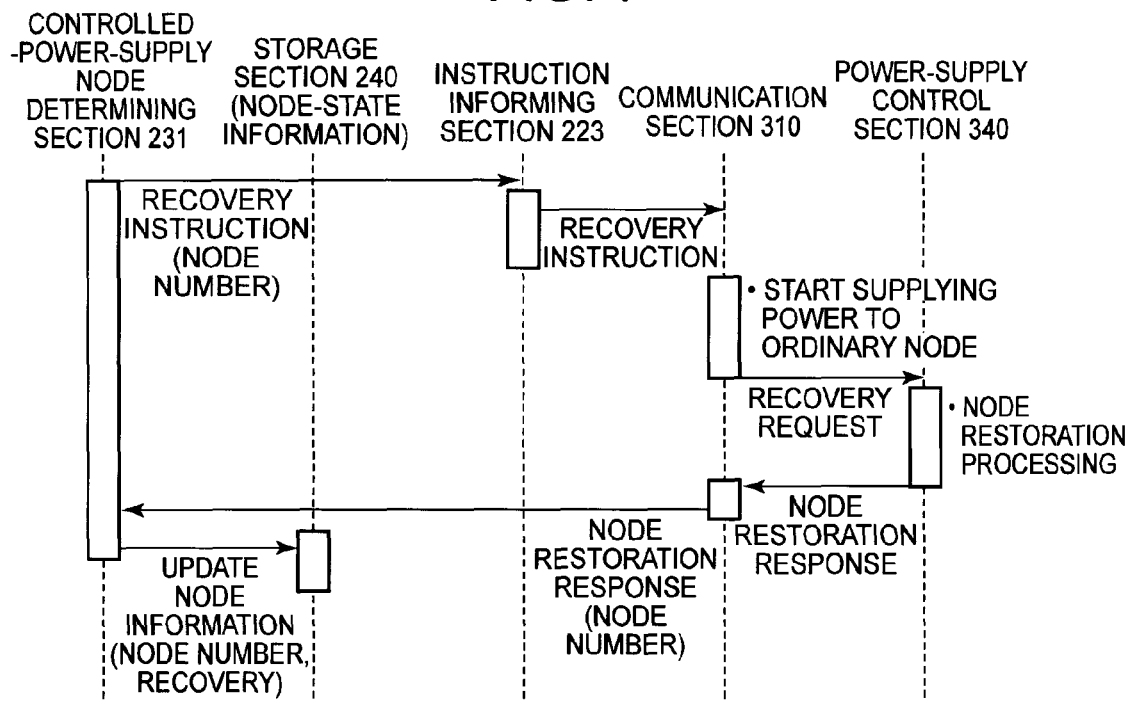
FIG. 7 It depicts a sequence diagram showing an example of processing which is carried out in the distributed system when a controlled-power-supply node determining section issues a recovery instruction.

FIG. 7 is a sequence diagram showing an example of processing which is carried out when a controlled-power-supply node determining section 231 issues a recovery instruction.

The controlled-power-supply node determining section 231 issues a recovery instruction specifying the node number of an ordinary node 300 to be restored to the ordinary node 300. The issued recovery instruction is supplied to the recovery-instruction receiving section 330 employed in the ordinary node 300 to be restored by way of the instruction informing section 223.

To put it concretely, the controlled-power-supply node determining section 231 identifies an ordinary node to be restored and outputs a recovery instruction including the node number of the identified ordinary node to the instruction informing section 223. Then, the instruction informing section 223 transmits the recovery instruction to the recovery-instruction receiving section 330 employed in the ordinary node 300 identified by the node number by way of the network.

When the recovery-instruction receiving section 330 employed in the ordinary node 300 receives the recovery instruction, it starts electrical conduction of the ordinary node 300 and outputs a request for a recovery to the power-supply control section 340. Receiving the request, the power-supply control section 340 carries out recovery processing for the ordinary node 300. An example of the recovery processing for the ordinary node 300 is control to drive the ordinary node 300 to make a transition from a stopped state to an idle state.

As the recovery processing carried out by the power-supply control section 340 is completed, the ordinary node 300 transmits a node restoration response indicating that the recovery processing has been completed, and its own node number to the management node 200 by making use of the communication section 310.

When the controlled-power-supply node determining section 231 employed in the management node 200 receives the node restoration response, it updates node-state information stored in the storage section 240. To put it concretely, the controlled-power-supply node determining section 231 updates the node-state information so that the updated node-state information indicates that the ordinary node 300 transmitting the node restoration response is operating.

In addition, at the same time, the controlled-power-supply node determining section 231 informs the task-assignment determining section 222 that the ordinary node 300 which was in a stopped state has been restored. Informed that the ordinary node 300 has been restored, the task-assignment determining section 222 issues a task execution instruction to the ordinary node 300.

Figure 8:
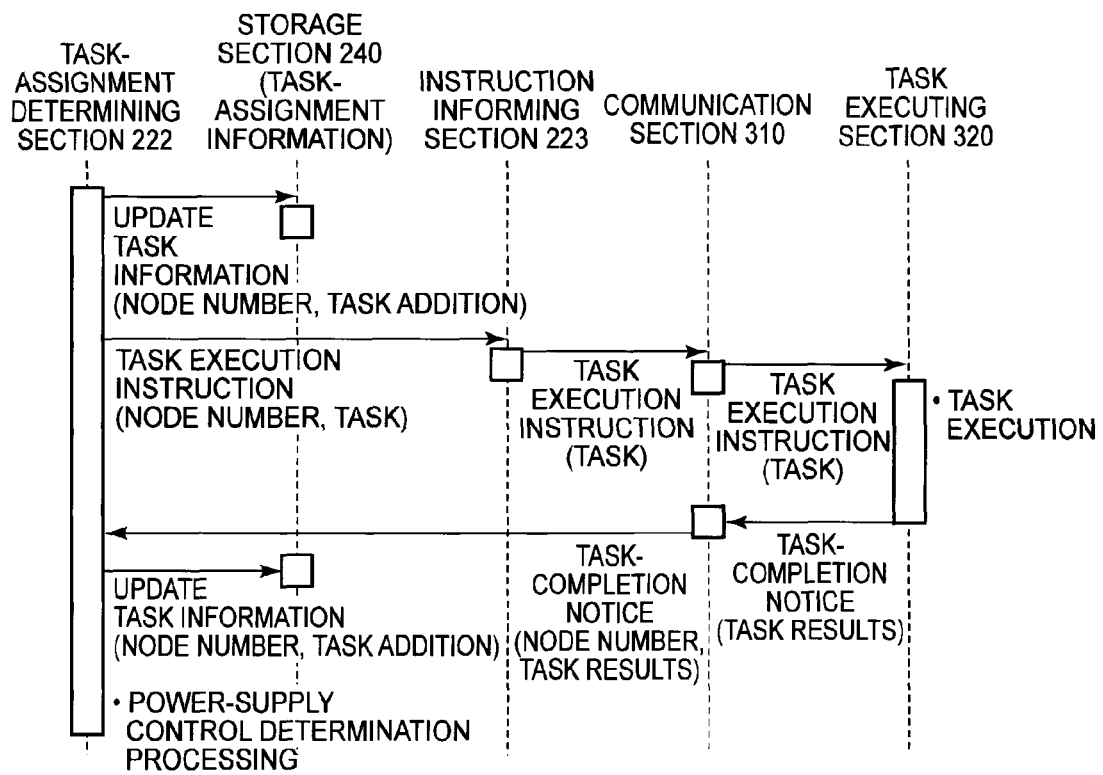
FIG. 8 It depicts a sequence diagram showing an example of processing which is carried out in the distributed system when a task-assignment determining section 222 issues a task execution instruction.

FIG. 8 is a sequence diagram showing a typical flow of processing which is started when the task-assignment determining section 222 issues a task execution instruction to an ordinary node 300 and is terminated when the ordinary node 300 terminates the execution of a task.

Before the task-assignment determining section 222 issues the task execution instruction to the ordinary node 300 selected to carry out the task, it updates task-assignment information. To put it concretely, the task-assignment determining section 222 updates the task-assignment information so that the updated task-assignment information indicates that the ordinary node 300 selected to carry out the task is carrying out the task.

After the task-assignment determining section 222 has updated the task-assignment information, it transmits the task execution instruction to the ordinary node 300 selected to carry out the task by way of the instruction informing section 223.

In the ordinary node 300, when the communication section 310 receives the task execution instruction, the task executing section 320 carries out the task in accordance with the task execution instruction.

When the task executing section 320 completes the execution of the task, the ordinary node 300 makes use of the communication section 310 to notify the management node 200 that the execution of the task has been completed and transmit a result of the execution of the task to the management node 200.

When the management node 200 is notified that the execution of the task has been completed, the task-assignment determining section 222 employed in the management node 200 updates the task-assignment information so that the updated task-assignment information indicates that the execution of the task has been completed. That is to say, the task-assignment determining section 222 updates the task-assignment information so that the updated task-assignment information indicates that the ordinary node 300 serving as an object of processing is not carrying out a task. Then, after the task-assignment determining section 222 has updated the task-assignment information, the management node 200 carries out power-supply control determination processing.

In the power-supply control determination processing, the management node 200 determines stopped states so as to satisfy a required-node count set in advance for every state in the following priority order: the idle state, level 1 of the stopped state and level 2 of the stopped state. If the number of ordinary nodes 300 required for each of the idle state, level 1 of the stopped state and level 2 of the stopped state has been satisfied, the power-supply control determination processing is terminated at level 3 of the stopped state.

The controlled-power-supply node determining section 231 holds a value set in advance as the number of nodes required for each of the idle state and the levels of the stopped state in the power-supply control determination processing. Each of the values each set in advance to represent the number of nodes can be a fixed value or a non-fixed value. For example, typical fixed values are set at 0 for the idle state, 5 for level 1 of the stopped state and 15 for level 2 of the stopped state. On the other hand, typical non-fixed values are set at (the number of all nodes−the number of executed nodes)×0% representing the number of ordinary nodes each put in the idle state, (the number of all nodes−the number of executed nodes)×10% representing the number of ordinary nodes each put at level 1 of the stopped state and (the number of all nodes−the number of executed nodes)×30% representing the number of ordinary nodes each put at level 2 of the stopped state. That is to say, it is also possible to provide a method for computing the number of required nodes from the number of ordinary nodes 300 each put in one of the states at that point of time.

Figure 9:
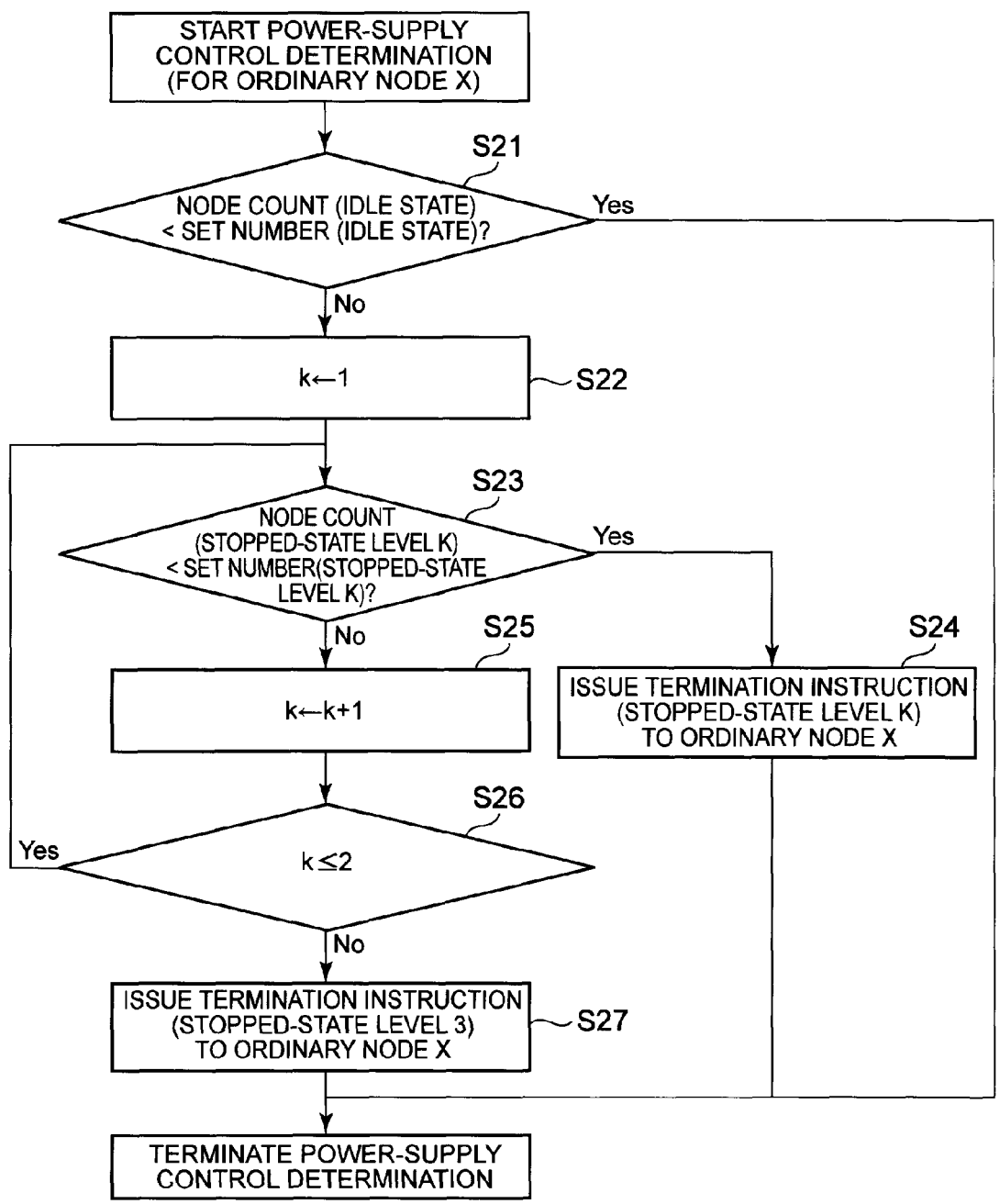
FIG. 9 It depicts a flowchart showing an example of the procedure of power-supply control determination processing carried out in the distributed system by the node power-supply control section.

Next, the procedure of the power-supply control determination processing is explained. FIG. 9 is a flowchart showing an example of the procedure of the power-supply control determination processing.

As shown in the figure, the flowchart begins with a step S21 at which the controlled-power-supply node determining section 231 compares the number of ordinary nodes each put in an idle state with a value set in advance in order to determine whether or not the number of ordinary nodes each put in an idle state is smaller than the set value. If the controlled-power-supply node determining section 231 determines that the number of ordinary nodes each put in an idle state is smaller than the set value, the controlled-power-supply node determining section 231 terminates the power-supply control determination processing without carrying out anything.

If the controlled-power-supply node determining section 231 determines that the number of ordinary nodes each put in an idle state is equal to or greater than the set value, on the other hand, the controlled-power-supply node determining section 231 compares the number of stopped ordinary nodes each put at level k of the stopped state with a value set in advance for level k of the stopped state. This comparison is carried out sequentially for levels of the stopped state in a level order starting with level 1 of the stopped state and ending with level 2 of the stopped state.

Then, if the number of stopped ordinary nodes each put at level k of the stopped state is found smaller than the value set in advance for level k of the stopped state in the comparison carried out for level k of the stopped state, the controlled-power-supply node determining section 231 determines to terminate the power-supply control determination processing at level k of the stopped state. If the controlled-power-supply node determining section 231 determines not to terminate the power-supply control determination processing at level 1 of the stopped state or level 2 of the stopped state, the controlled-power-supply node determining section 231 determines to terminate the power-supply control determination processing at level 3 of the stopped state. When the controlled-power-supply node determining section 231 determines to terminate the power-supply control determination processing, the node power-supply control section 230 issues a termination instruction to the ordinary node 300 serving as an object of processing.

As an example shown in FIG. 9, the controlled-power-supply node determining section 231 determines whether or not the number of nodes, that are in an idle state, each put at level k of the stopped state is smaller than the value set in advance for level k of the stopped state (in this case, level 1 of the stopped state) (steps S22 and S23).

If it is determined that the number of nodes in an idle state is smaller than the set value at the step S23, the flow of the procedure of the power-supply control determination processing goes on to a step S24. At this step S24, the controlled-power-supply node determining section 231 determines to make a transition to level k of the stopped state (which is level 1 of the stopped state this time) and issues a termination instruction to the ordinary nodes 300 serving as an object of the power-supply control determination processing. Then, the controlled-power-supply node determining section 231 terminates the power-supply control determination processing.

If it is determined that the number of nodes in an idle state is equal to or greater than the set value at the step S23, on the other hand, the sequence of the processes of the step S23 is carried out repeatedly till the level 3 of the stopped state is reached (steps S25 and S26). Then, at the next step S27, the controlled-power-supply node determining section 231 determines to make a transition to level 3 of the stopped state and issues a termination instruction to the ordinary node 300 serving as an object of the power-supply control determination processing. Then, the controlled-power-supply node determining section 231 terminates the power-supply control determination processing.

Figure 10:
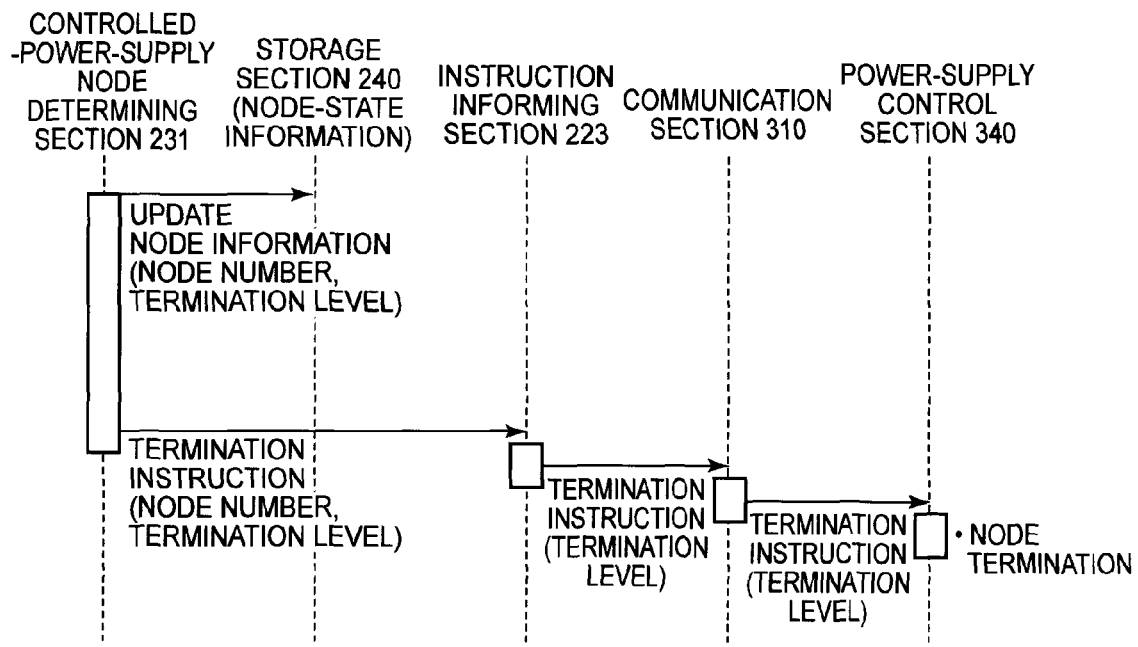
FIG. 10 It depicts a sequence diagram showing an example of processing which is carried out in the distributed system when the node power-supply control section issues a termination instruction.

FIG. 10 is a sequence diagram showing a typical flow of processing which is started when the controlled-power-supply node determining section 231 employed in the node power-supply control section 230 issues a task execution instruction to an ordinary node 300 and is terminated when the ordinary node 300 is stopped in a reduced-power state.

First of all, the controlled-power-supply node determining section 231 updates node-state information so that the updated node-state information indicates that the state of an ordinary node 300 to be terminated has been put in a stopped state. Then, the controlled-power-supply node determining section 231 transmits a termination instruction to the ordinary node 300 to be terminated by way of the instruction informing section 223. In the ordinary node 300, when the communication section 310 receives the termination instruction, the communication section 310 forwards the instruction to the power-supply control section 340. Receiving the termination instruction, the power-supply control section 340 carries out control to terminate the ordinary node 300 at a stopped-state level specified by the instruction.

The distributed system according to this exemplary embodiment carries out a job in accordance with the execution flows described above.

It is to be noted that the controlled-power-supply node determining section 231 changes the level of the stopped state of an ordinary node 300 to a stop-state level having a shorter recovery time or an idle state with a timing asynchronous to the execution of a job so as to satisfy a required-node count set in advance for each of the idle state and the levels of the stopped state (node-count adjustment processing).

Figure 11:
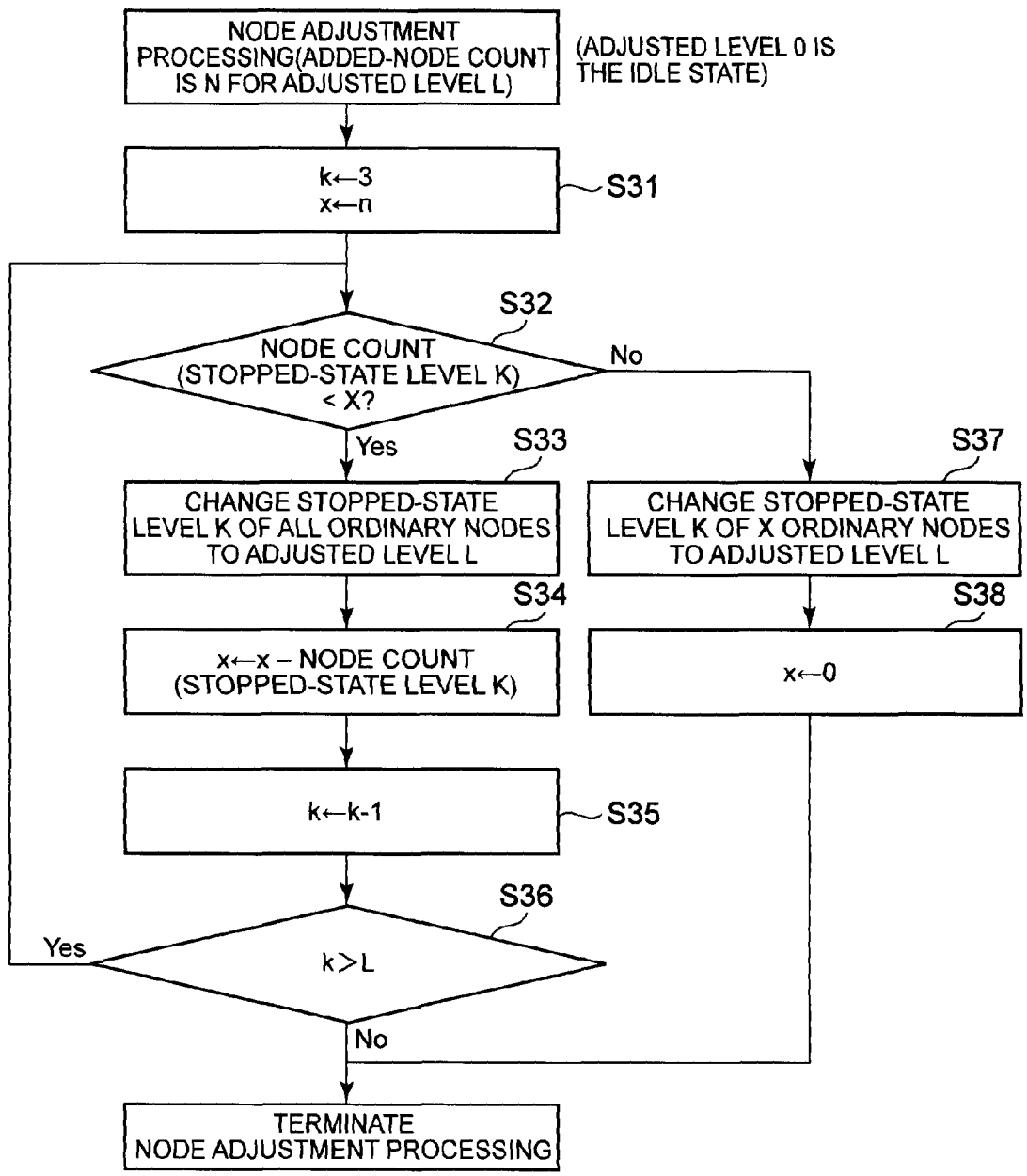
FIG. 11 It depicts a flowchart showing an example of the procedure of node-count adjustment processing carried out in the distributed system by the node power-supply control section.

FIG. 11 is a flowchart showing an example of the procedure of the node-count adjustment processing carried out to add n ordinary nodes 300 to the idle state or a level of the stopped state. It is to be noted that, to simplify the flowchart shown in FIG. 11, the idle state is referred to as level 0 of the stopped state.

As shown in FIG. 11, the controlled-power-supply node determining section 231 determines whether or not the number of ordinary nodes 300 each put at level k of the stopped state (which is level 3 of the stopped state) is smaller than the variable x (in this case, n) (steps S31 and S32). The node-count adjustment processing is carried out in accordance with this procedure in a level order starting with the highest level of the stopped state.

If the controlled-power-supply node determining section 231 determines that the number of ordinary nodes 300 each put at level k of the stopped state is smaller than the variable x, the flow of the procedure goes on to a step S33 at which the controlled-power-supply node determining section 231 changes level k of the stopped state of all the ordinary nodes 300 to level L of the stopped state. Then, the controlled-power-supply node determining section 231 sets the variable x at a difference obtained as a result of subtracting the number of ordinary nodes 300 each put at level k of the stopped state from the variable x, and the sequence of the processes of the steps S32 and S33 is carried out repeatedly in a level-number order starting with the largest stopped-state level number till the controlled-power-supply node determining section 231 determines that the stopped-state level number k is equal to or smaller than the stopped-state level number L (steps S34, S35, and S36). Thereafter, the controlled-power-supply node determining section 231 terminates the node-count adjustment processing.

If the controlled-power-supply node determining section 231 determines that the number of ordinary nodes 300 each put at level k of the stopped state is equal to or greater than the variable x, on the other hand, the flow of the procedure goes on to a step S37 at which the controlled-power-supply node determining section 231 changes level k of the stopped state of only x ordinary nodes 300 to level L of the stopped state. Then, at the next step S38, the controlled-power-supply node determining section 231 sets the variable x at 0. Finally, the controlled-power-supply node determining section 231 terminates the node-count adjustment processing.

By carrying out the processing procedure represented by a flowchart shown in FIG. 11, it is possible to drive n ordinary nodes 300 each put at a relatively high level of the stopped state to make a transition to level L of the stopped state. It is to be noted that, in order to drive an ordinary node 300 put at a high level of the stopped state to make a transition to a relatively low level of the stopped state, for example, a recovery instruction is used to restore the ordinary node 300 to an idle state (as shown typically in FIG. 7) and, then, after a recovery response has been received from the ordinary node 300, a termination instruction is used to terminate the ordinary node 300 (as shown typically in FIG. 10) in a stopped-state.

The timing with which the node-count adjustment processing is carried out can be set arbitrarily. It is desirable, however, to carry out the node-count adjustment processing typically with a timing after a period determined in advance has lapsed since the final issuance of a request for power-supply control (or a termination instruction or a recovery instruction).

A distributed system according to the exemplary embodiment has been explained above. By adoption of such an exemplary embodiment, the distributed system according to the present invention can be made capable of reducing the amount of electric power consumed by the entire distributed system by putting an ordinary node in a stopped state and capable of preventing the processing performance from deteriorating when the load increases. The distributed system is capable of preventing the processing performance from deteriorating by restoring ordinary nodes in an ordinary-node order starting with an ordinary node existing at a level of the stopped state and having a short recovery time and by driving the ordinary nodes to carry out tasks assigned thereto.

It is to be noted that implementations of the distributed system according to the present invention are by no means limited to the exemplary embodiment described above. That is to say, it is possible to make a typical change described as follows.

In the distributed system according to the exemplary embodiment described above, an ordinary node 300 is capable of carrying out only one task at a time. However, an ordinary node 300 can also be made capable of carrying out a plurality of tasks at the same time. In this case, it is necessary to manage all tasks assigned to ordinary nodes 300 by making use of the task-assignment information. In addition, in a process carried out by the task-assignment determining section 222 to assign tasks to an ordinary node 300, it is possible to adopt a task-assignment determination method of selecting an ordinary node 300 carrying out only few tasks at the present time among activated ordinary nodes 300 and assigning many tasks to the selected ordinary node 300.

The present invention has been described above by explaining an exemplary embodiment. However, implementations of the distributed system according to the present invention are by no means limited to the exemplary embodiment explained above. That is to say, it is possible to make a variety of changes that can be understood by a person skilled in the art to the configuration of the present invention and details thereof as long as the changes fall within the scope of the present invention.

Figure 12:
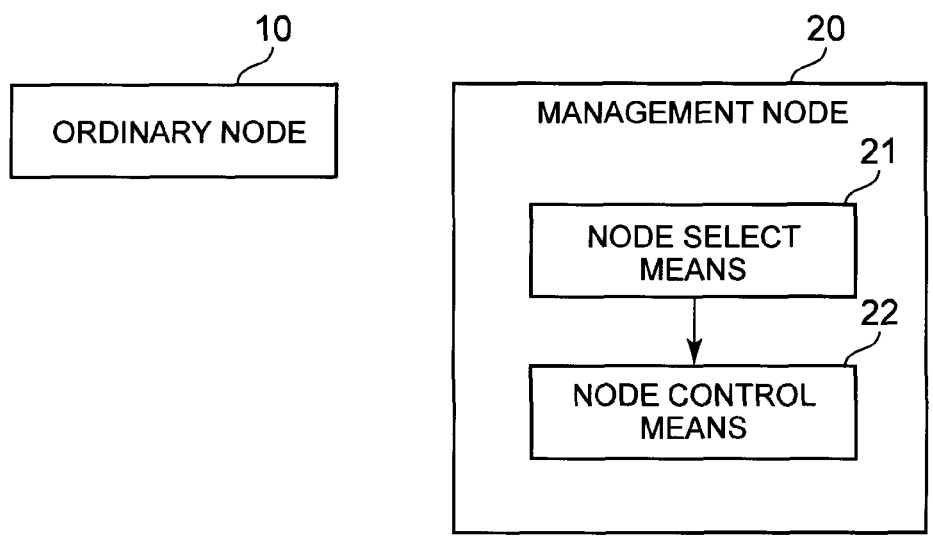
FIG. 12 It depicts a block diagram showing an example of the minimum configuration of the distributed system.

Next, a minimum configuration of the distributed system according to the present invention is explained. FIG. 12 is a block diagram showing an example of the minimum configuration of the distributed system. As shown in FIG. 12, the distributed system comprises minimum-configuration elements such as ordinary nodes 10 and a management node 20. Each of the ordinary nodes 10 can be put in one of a plurality of reduced-power states having different times of recovery to a normal operating state. On the other hand, the management node 20 assigns a job to the ordinary node 10 and requests the ordinary node 10 to carry out the job. In addition, the management node 20 comprises node select means 21 and node control means 22.

In the distributed system having the minimum configuration shown in FIG. 12, the node select means 21 selects an ordinary node 10 from ordinary nodes 10 each put in one of reduced-power states, assigns a job to the selected ordinary node 10 and requests the selected ordinary node 10 to carry out the assigned job. In this case, the node select means 21 selects an ordinary node 10 from ordinary nodes 10 each put in one of the reduced-power states in an ordinary-node order starting with an ordinary node 10 put in a reduced-power state having a short time of recovery to the normal operating state. Then, the node control means 22 carries out control to restore the ordinary node 10 selected by the node select means 21 to the normal operating state.

Thus, in accordance with the distributed system having the minimum configuration, it is possible to reduce the amount of electric power consumed by the entire distributed system by putting ordinary nodes in a stopped state and prevent the processing performance from deteriorating by restoring the ordinary nodes to the normal operating state and driving the restored ordinary nodes to carry out tasks assigned to the ordinary nodes when the load increases. In this case, the ordinary nodes are restored and driven sequentially in an ordinary-node order starting with an ordinary node put in a low-level stopped state having a short time of recovery to the normal operating state.

It is to be noted that the exemplary embodiment implements the following characteristic configurations (1) to (7) of the distributed system.

(1) The distributed system is characterized in that:
the distributed system includes: a plurality of ordinary nodes (each implemented typically as the ordinary node 300) provided with reduced-power states having different times of recovery to a normal operating state (such as an active state or an idle state); and a management node (implemented typically as the management node 200) for assigning a job to an ordinary node and driving the ordinary node to carry out the job assigned thereto;
the management node has: node select means (implemented typically as the task-assignment determining section 222 and the controlled-power-supply node determining section 231) for selecting an ordinary node from ordinary nodes each put in one of the reduced-power states, assigning a job to the selected ordinary node and driving the selected ordinary node to carry out the assigned job; and node control means (implemented typically as the controlled-power-supply node determining section 231) for executing control to restore an ordinary node selected by the node select means to the normal operating state; and
the node select means selects an ordinary node from the ordinary nodes each put in one of the reduced-power states having different times of recovery to the normal operating state in accordance with an ordinary-node order starting with an ordinary node existing in a reduced-power state and having a short time of recovery to the normal operating state.

(2) Each of the ordinary nodes employed in the distributed system has at least a processor for carrying out arithmetic processing as well as a memory and a nonvolatile storage apparatus which are used for storing information. There are provided at least three different reduced-power states to which an ordinary node is capable to make a transition. The different reduced-power states include a first reduced-power state (such as level 1 of the stopped state), a second reduced-power state (such as level 2 of the stopped state) and a third reduced-power state (such as level 3 of the stopped state). In the first reduced-power state, only the power supply of the processor is turned off whereas, in the second reduced-power state, arithmetic contexts are saved in the memory and power supplies other than the power supply of the memory are turned off. In the third reduced-power state, on the other hand, the arithmetic contexts are saved in the nonvolatile storage apparatus and all power supplies are turned off. It is possible to provide a configuration in which, when the node select means selects a particular ordinary node from ordinary nodes each put in a reduced-power state, assigns a task to the selected ordinary node and drives the selected ordinary node to carry out the assigned task, the node select means selects the particular ordinary node by giving priority to ordinary nodes in the following order: ordinary nodes each put in the first reduced-power state, ordinary nodes each put in the second reduced-power state and ordinary nodes each put in the third reduced-power state.

(3) The distributed system is characterized in that:

the distributed system includes: ordinary nodes (each implemented typically as the ordinary node 300) each including power-supply control means (implemented typically as the power-supply control section 340) and task executing means (implemented typically as the task executing section 320); and a management node (implemented typically as the management node 200) including job receiving means (implemented typically as the job receiving section 210) for receiving a job execution instruction, job managing means (implemented typically as the job control section 220) for disassembling a job received by the job receiving means into one task or a plurality of tasks and for driving one ordinary node or a plurality of ordinary nodes to execute the tasks, and node power-supply control means (implemented typically as the node power-supply control section 230) for managing as well as controlling the states of power supplies of the ordinary nodes;

the power-supply control means has: a function to put an ordinary node in a reduced-power state at one of a plurality of stages having different amounts of electric power consumed at the reduced-power state and different times of recovery from the reduced-power state to a normal activated state; and a function to restore an ordinary node in a reduced-power state to the normal activated state;

the job managing means determines an ordinary-node count representing the number of ordinary nodes for carrying out tasks obtained as a result of disassembling a job received by the management node in accordance with the magnitude of the job (this determination of an ordinary-ode count is implemented typically by carrying out processing by making use of the job disassembling section 221 and the task-assignment determining section 222);

if the number of ordinary nodes each put in the normal activated state and capable of carrying out the tasks is smaller than the ordinary-node count determined by the job managing means to represent the number of ordinary nodes for carrying out the tasks, the node power-supply control means carries out an active-node select function to select as many ordinary nodes from the ordinary nodes put at one or more state stages selected from the stages of the reduced-power state as required to satisfy the ordinary-node count representing the number of ordinary nodes for carrying out the tasks (this function is implemented typically by carrying out processing by making use of the controlled-power-supply node determining section 231);

the node power-supply control means carries out the active-node select function to select ordinary nodes to be restored to the normal activated state among the ordinary nodes each put at one of the stages of the reduced-power state in accordance with an ordinary-node order starting with an ordinary node existing in a reduced-power state and having a short time of recovery to the normal activated state (this function is implemented typically by carrying out processing by making use of the controlled-power-supply node determining section 231);

the node power-supply control means issues an activation instruction to each of the selected ordinary nodes as an instruction requesting the ordinary node to make a transition to the normal activated state (this issuance of an activation instruction is implemented typically by carrying out processing by making use of the controlled-power-supply node determining section 231);

the job managing means issues task execution instructions to ordinary nodes which are in the normal activated state and capable of executing tasks and to ordinary nodes restored to the normal activated state in accordance with the activation instruction issued by the node power-supply control means to serve as task execution instructions requesting the ordinary nodes to execute the tasks; and the task executing means carries out the tasks in accordance with the task execution instructions issued by the job managing means.

(4) Each of the ordinary nodes employed in the distributed system has at least a processor for carrying out arithmetic processing as well as a memory and a nonvolatile storage apparatus which are used for storing information. The power-supply control means may be configured to control at least three different reduced-power states. The different reduced-power states include a first reduced-power state (such as level 1 of the stopped state), a second reduced-power state (such as level 2 of the stopped state) and a third reduced-power state (such as level 3 of the stopped state). In the first reduced-power state, only the power supply of the processor is turned off whereas, in the second reduced-power state, arithmetic contexts are saved in the memory and power supplies other than the power supply of the memory are turned off. In the third reduced-power state, on the other hand, the arithmetic contexts are saved in the nonvolatile storage apparatus and all power supplies are turned off.

(5) In the distributed system, the node power-supply control means may be configured to select ordinary nodes to be restored to the normal activated state first of all from ordinary nodes each put in the first reduced-power state, then from ordinary nodes each put in the second reduced-power state and finally from ordinary nodes each put in the third reduced-power state.

(6) In the distributed system, the node power-supply control means may be configured to determine an operation of driving an ordinary node completing execution of a task to make a transition to one of at the stages of a reduced-power state and to issue a node termination instruction requesting the ordinary node to make the determined transition to the stage of the reduced-power state to the ordinary node.

(7) In the distributed system, the node power-supply control means may be configured to determine a transition to a reduced-power state having a short time of recovery to the normal activated state in comparison with the reduced-power-state recovery times shorter than a time period determined in advance for each of the reduced-power states prior to an operation carried out to issue a node termination instruction to an ordinary node completing execution of a task.

Some or all portions of the exemplary embodiment described above can also be explained as described in the following supplementary note. However, the present invention is by no means limited to what are described in the supplementary note.

Supplementary Note 1

The distributed system wherein, if the number of ordinary nodes each selected from ordinary nodes each put in one of reduced-power states as an ordinary node put in a reduced-power state having a short time of recovery to the normal activated state is equal to or smaller than a time period determined in advance, the node power-supply control means determines an operation of driving one ordinary node or a plurality of ordinary nodes selected among ordinary nodes each put in a reduced-power state having a long time of recovery to the normal activated state to make a transition to a reduced-power state having a short time of recovery to the normal activated state, issues recovery instructions to the ordinary nodes selected to make the determined transition and issues node termination instructions to the ordinary nodes selected to make the determined transition after the ordinary nodes have been restored to the normal activated state.

The present invention has been described above by explaining an exemplary embodiment and implementations. However, realizations of the present invention are by no means limited to the exemplary embodiment and the implementations. That is to say, it is possible to make a variety of changes that can be understood by a person skilled in the art to the configuration of the present invention and details thereof as long as the changes fall within the scope of the present invention.

This application claims a priority right based on Japanese Patent Application JP 2011-020949 filed in the Japan Patent Office on Feb. 2, 2011, the entire contents of which are incorporated herein by reference.

INDUSTRIAL APPLICABILITY

The distributed system provided by the present invention can be applied to a distributed computer, a distributed database, a distributed storage, a concurrent data processing system, a concurrent-processing file system, a concurrent-processing database, a data grid and a cluster computer.

REFERENCE SIGNS LIST

10: Ordinary node
20: Management node
21: Node select means
22: Node control means
100: Client node
200: Management node
210: Job receiving section
220: Job control section
221: Job disassembling section
222: Task-assignment determining section
223: Instruction informing section
230: Node power-supply control section
231: Controlled-power-supply node determining section
240: Storage section
300: Ordinary node
310: Communication section
320: Task executing section
330: Recovery-instruction receiving section
340: Power-supply control section

What is claimed is:

1. A distributed system comprising: ordinary nodes each including a power-supply control unit and a task executing unit; and a management node including a job receiving unit for receiving a job execution instruction, a job managing unit for disassembling a job received by said job receiving unit into one task or a plurality of tasks and for driving one of said ordinary nodes or a plurality of said ordinary nodes to carry out said tasks, and a node power-supply control unit for managing as well as controlling the states of power supplies of said ordinary nodes, wherein:

said power-supply control unit has: a function to put any one of said ordinary nodes in a reduced-power state at one of a plurality of stages having different amounts of electric power consumed at said reduced-power state and different times of recovery from said reduced-power state to a normal activated state; and a function to restore any one of said ordinary nodes in a reduced-power state to said normal activated state;

said job managing unit determines an ordinary-node count representing the number of said ordinary nodes for carrying out tasks obtained as a result of disassembling a job received by said management node in accordance with the magnitude of said job;

if the number of said ordinary nodes each put in said normal activated state and capable of carrying out said tasks is smaller than said ordinary-node count determined by said job managing unit to represent the number of said ordinary nodes for carrying out said tasks, said node power-supply control unit carries out an active-node select function to select as many ordinary nodes from said ordinary nodes put at one or more state stages selected from said stages of said reduced-power state as required to satisfy said ordinary-node count representing the number of ordinary nodes for carrying out said tasks;

said node power-supply control unit carries out said active-node select function to select ordinary nodes to be restored to said normal activated state among said ordinary nodes each put at one of said stages of said reduced-power state in accordance with an ordinary-node order starting with said ordinary node existing in a reduced-power state and having a short time of recovery to said normal activated state;

said node power-supply control unit issues an activation instruction to each of said selected ordinary nodes as an instruction requesting said ordinary node to make a transition to said normal activated state;

said job managing unit issues task execution instructions to said ordinary nodes which are already put in said normal activated state and capable of executing tasks and to said ordinary nodes restored to said normal activated state in accordance with said activation instruction issued by said node power-supply control unit to serve as task execution instructions requesting said ordinary nodes to execute said tasks; and said task executing unit carries out said tasks in accordance with said task execution instructions issued by said job managing unit, wherein: each of said ordinary nodes has at least a processor for carrying out arithmetic processing as well as a memory and a nonvolatile storage apparatus which are used for storing information.

2. The distributed system according to claim 1, wherein:
at least three different reduced-power states are used in control carried out by said power-supply control unit;
said three different reduced-power states are a first reduced-power state, a second reduced-power state and a third reduced-power state;
in said first reduced-power state, only the power supply of said processor is turned off;
in said second reduced-power state, arithmetic contexts are saved in said memory and power supplies other than the power supply of said memory are turned off; and in said third reduced-power state, said arithmetic contexts are saved in said nonvolatile storage apparatus and all power supplies are turned off.

3. The distributed system according to claim 2, wherein said node power-supply control unit control selects ordinary nodes to be restored to said normal activated state first of all from said ordinary nodes each put in said first reduced-power state, then from said ordinary nodes each put in said second reduced-power state and finally from said ordinary nodes each put in said third reduced-power state.

4. The distributed system according to claim 1, wherein said node power-supply control unit determines an operation of driving said ordinary node completing execution of a task to make a transition to one of said stages of said reduced-power state and issues a node termination instruction requesting said driven ordinary node to make said determined transition to said reduced-power state to said ordinary node.

5. The distributed system according to claim 4, wherein said node power-supply control unit determines an operation of driving said ordinary node completing execution of a task to make a transition to said reduced-power state having a short time of recovery to said normal activated state in comparison with reduced-power-state recovery times shorter than a time period determined in advance for each of said reduced-power states prior to an operation carried out to issue a node termination instruction to said ordinary node completing execution of a task.

* * * * *